(12) United States Patent
Dito et al.

(10) Patent No.: US 11,528,083 B2
(45) Date of Patent: Dec. 13, 2022

(54) METHODS AND APPARATUS FOR PROVIDING EMULATION OF OPTICAL MODULES

(71) Applicant: Telefonaktiebolaget LM Ericsson (publ), Stockholm (SE)

(72) Inventors: Pierluigi Dito, Genoa (IT); Fabio Fontana, Genoa (IT); Davide Sanguinetti, Genoa (IT)

(73) Assignee: Telefonaktiebolaget LM Ericsson (Publ), Stockholm (SE)

( * ) Notice: Subject to any disclaimer, the term of this patent is extended or adjusted under 35 U.S.C. 154(b) by 167 days.

(21) Appl. No.: 16/954,877

(22) PCT Filed: Dec. 21, 2017

(86) PCT No.: PCT/EP2017/084216
§ 371 (c)(1),
(2) Date: Jun. 17, 2020

(87) PCT Pub. No.: WO2019/120552
PCT Pub. Date: Jun. 27, 2019

(65) Prior Publication Data
US 2020/0403719 A1    Dec. 24, 2020

(51) Int. Cl.
*G06F 9/455* (2018.01)
*H04J 3/06* (2006.01)
(Continued)

(52) U.S. Cl.
CPC .......... *H04J 3/0608* (2013.01); *G02B 6/4284* (2013.01); *H04B 10/40* (2013.01);
(Continued)

(58) Field of Classification Search
CPC ................... H04J 3/1652; H04J 3/1611; H04J 2203/0089; H04J 3/0608; H04J 3/1617;
(Continued)

(56) References Cited

U.S. PATENT DOCUMENTS 6,807,523 B1 * 10/2004 Wensink ............... H04L 41/145
703/27
8,290,372 B2   10/2012 Oku
(Continued)

OTHER PUBLICATIONS

International Search Report and Written Opinion dated Sep. 27, 2018, for International Application No. PCT/EP2017/084216 filed on Dec. 21, 2017, consisting of 11-pages.
(Continued)

*Primary Examiner* — Eva Y Puente
(74) *Attorney, Agent, or Firm* — Christopher & Weisberg, P.A.

(57) ABSTRACT

Methods and apparatus for emulating optical modules. A method includes receiving, from an optical module emulator, a first serial data stream having the plurality of upstream signals multiplexed into a plurality of bits; wherein the first data stream includes a plurality of frames, each frame having a multi-frame alignment bit; and de-multiplexing the plurality of upstream signals based on each multi-frame alignment bit within each respective frame. A method includes receiving, from an emulator controller, a second serial data stream having a plurality of downstream signals multiplexed into a plurality of bits; wherein the second serial data stream includes a plurality of frames, each frame having a multi-frame alignment bit; and de-multiplexing the plurality of downstream signals based on each multi-frame alignment bit within each respective frame.

22 Claims, 13 Drawing Sheets

(51) Int. Cl.
*G02B 6/42* (2006.01)
*H04B 10/40* (2013.01)
*H04J 3/16* (2006.01)

(52) U.S. Cl.
CPC ............ *H04J 3/1605* (2013.01); *G06F 9/455* (2013.01); *H04L 2209/56* (2013.01)

(58) Field of Classification Search
CPC ...... H04J 4/00; H04J 14/0227; H04J 14/0246; H04J 3/14; H04J 3/1658; H04J 3/1664; H04J 14/02; H04J 14/025; H04B 10/2569; H04B 10/2572; H04B 17/3911; H04B 7/0413; H04B 10/40; H04L 12/2801; H04L 65/1016; H04L 7/041; H04L 29/06027; H04L 27/2657; H04L 65/608; H04L 12/403; H04L 1/0071; H04L 27/2602; H04L 25/4908; H04L 27/2613; H04L 45/04
USPC .................................. 375/368; 398/135, 184
See application file for complete search history.

(56) References Cited

U.S. PATENT DOCUMENTS

2008/0212980 A1* 9/2008 Weiner ............... H04B 10/2569
398/184
2009/0094492 A1* 4/2009 Music ................ H04B 17/3911
714/E11.159
2015/0349906 A1 12/2015 Christensen et al.
2016/0057518 A1 2/2016 Neudorf

OTHER PUBLICATIONS

SFF Committee; INF-8074i Specification for SFP (Small Formfactor Pluggable) Transceiver; Rev 1.0; May 12, 2001, consisting of 39-pages.
SFF Committee; SFF-8419 Specification for SFP+ Power and Low Speed Interface; Rev 1.3; Jun. 11, 2015, consisting of 33-pages.
SFF Committee; SFF-8431 Specification for SFP+ 10 GB/s and Low Speed Electrical Interface; Rev 4.1; Jul. 6, 2009; Rev 4.1 Addendum; Sep. 15, 2013, consisting of 137-pages.
SFF Committee; SFF-8472 Specification for Diagnostic Monitoring Interface for Optical Transceivers; Rev 12.2; Nov. 21, 2014, consisting of 42-pages.
SFF Committee; SFF-8679 Specification for QSFP+ 4X Base Electrical Specification; Rev 1.7; Aug. 12, 2014, consisting of 31-pages.
Snia SFF TWG Technology Affiliate; SFF-8636 Specification for Management Interface for Cabled Environments; Rev 2.9; Apr. 21, 2017, consisting of 90-pages.
UM10204 I2C-Bus Specification and User Manual; Rev. 6; Apr. 4, 2014, consisting of 64-pages.

* cited by examiner

METHODS AND APPARATUS FOR PROVIDING EMULATION OF OPTICAL MODULES

CROSS-REFERENCE TO RELATED APPLICATIONS

This application is a Submission Under 35 U.S.C. § 371 for U.S. National Stage Patent Application of International Application Number: PCT/EP2017/084216, filed Dec. 21, 2017 entitled "METHODS AND APPARATUS FOR PROVIDING EMULATION OF OPTICAL MODULES," the entirety of which is incorporated herein by reference.

TECHNICAL FIELD

Embodiments described herein relate to methods and apparatus for emulating an optical module. In particular, the embodiments described herein relate to emulating a plurality of upstream or downstream signals transmitted between an optical module emulator and an emulator controller by multiplexing the plurality of upstream or downstream signals into a single data stream.

BACKGROUND

An optical module control interface, for example an Inter-Integrated Circuit (I2C) serial computer bus, and its control signals are used by a host computer to recognize and configure the optical module itself, when it is plugged (typically) into a line card of the host computer.

Due to an evolving optical module market, lots of newly developed optical modules are made available for service providers to be used in the existing network scenarios. This means that it is responsibility of the equipment provider to guarantee the interworking between the existing network equipment and the newly introduced optical modules.

Even in a laboratory environment it may be difficult to check whether the control interface and the control signals of the optical module are working within the recommended timings, as this would require having both access to specific instruments (such as an oscilloscope with an I2C protocol analyzer) and physical access to the control interface and/or the control signals of the optical module, for example, using probes. This may then mean having to dismount the board that hosts the optical module.

For in-field checks dismounting of the board would be difficult, if not impossible. Furthermore, the availability and cost of the specific instruments required, may be limiting.

Currently, a Small Form-factor Pluggable (SFP) Terminal Emulator (STEM) has been developed to be placed in-between a host computer and a real optical module, connecting one another by an electrical cable so to replicate on the STEM the memory map of the real optical module, or to mimic the memory map of a given one.

This solution may provide memory map emulation but does not address the issue of emulating the control interface or control signals for timing monitoring and timing emulation.

SUMMARY

According to embodiments described herein there is provided a method in an emulator controller for obtaining a plurality of upstream signals for transmission to an optical module. The method comprises receiving, from an optical module emulator, a first serial data stream comprising the plurality of upstream signals multiplexed into a plurality of bits; wherein the first data stream comprises a plurality of frames, each frame comprising a multi-frame alignment bit; and de-multiplexing the plurality of upstream signals based on each multi-frame alignment bit within each respective frame.

According to some embodiments there is provided a method in an optical module emulator for obtaining a plurality of downstream signals transmitted by an emulator controller. The method comprises receiving, from the emulator controller, a second serial data stream comprising the plurality of downstream signals multiplexed into a plurality of bits; wherein the second serial data stream comprises a plurality of frames, each frame comprising a multi-frame alignment bit; and de-multiplexing the plurality of downstream signals based on each multi-frame alignment bit within each respective frame.

According to some embodiments there is provided an emulator controller for obtaining a plurality of upstream signals for transmission to an optical module. The emulator controller comprising an interface; and a processor. The processor is configured to receive, from an optical module emulator, a first serial data stream comprising the plurality of upstream signals multiplexed into a plurality of bits; wherein the first data stream comprises a plurality of frames, each frame comprising a multi-frame alignment bit; and de-multiplex the plurality of upstream signals based on each multi-frame alignment bit within each respective frame.

An optical module emulator for obtaining a plurality of downstream signals transmitted by an emulator controller. The optical module emulator comprises an interface; and a processor. The processor is configured to receive, from the emulator controller, a second serial data stream comprising the plurality of downstream signals multiplexed into a plurality of bits; wherein the second serial data stream comprises a plurality of frames, each frame comprising a multi-frame alignment bit; and de-multiplex the plurality of downstream signals based on each multi-frame alignment bit within each respective frame.

According to some embodiments there is provided a computer program comprising instructions which, when executed on at least one processor, cause the at least one processor to carry out the method as described above.

According to some embodiments there is provided computer program product comprising a computer-readable medium with the computer program as described above.

The embodiments described above therefore provide a communication protocol allowing for the transmission of the control interface and control signals using a single serial data stream from the optical module emulator to the emulator controller, and a single data stream from the emulator controller to the optical module emulator.

BRIEF DESCRIPTION OF THE DRAWINGS

For a better understanding of the present invention, and to show how it may be put into effect, reference will now be made, by way of example only, to the accompanying drawings, in which.

DESCRIPTION

Figure 1:
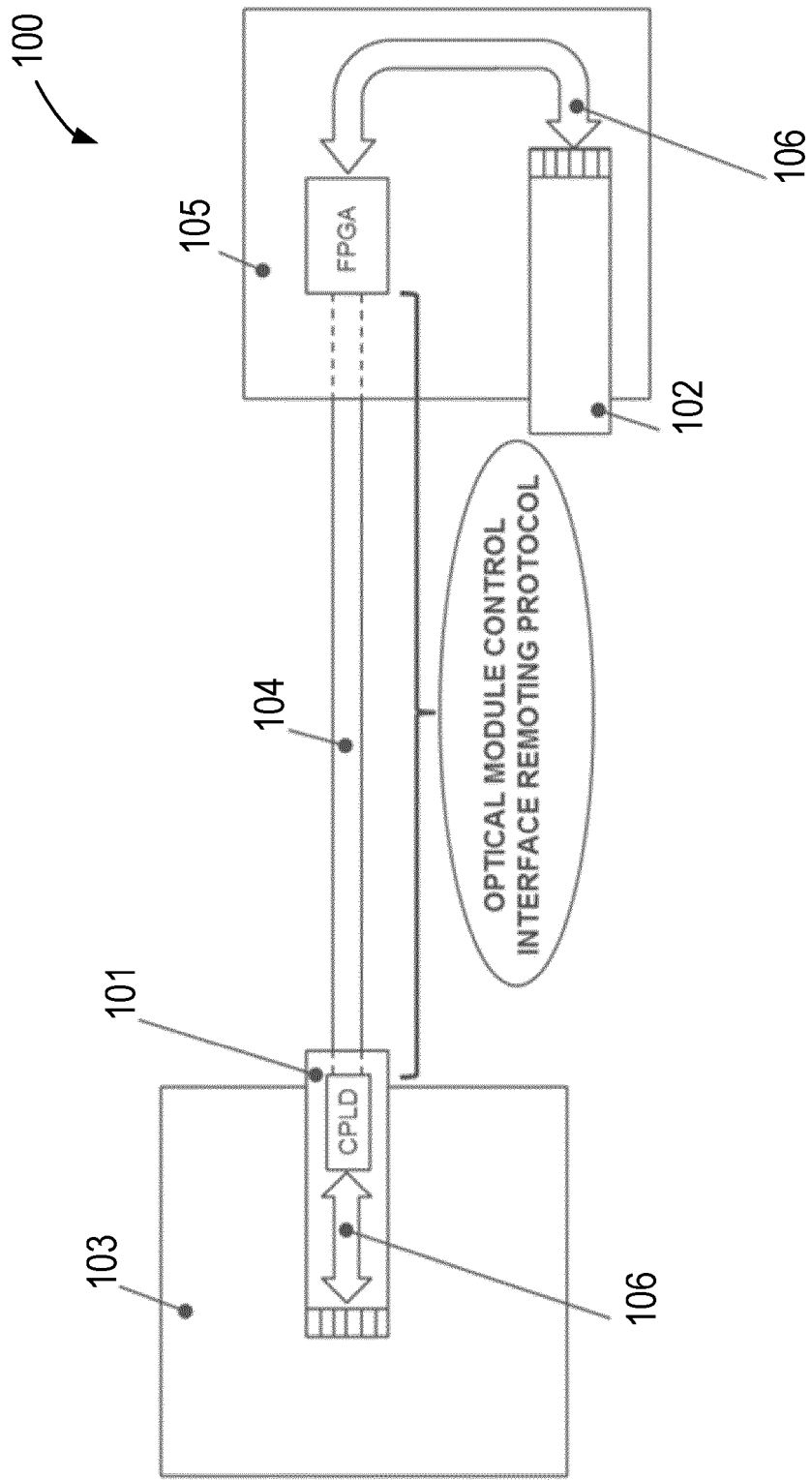
FIG. 1 illustrates an optical module emulator in a network according to some embodiments.

The following sets forth specific details, such as particular embodiments for purposes of explanation and not limitation. But it will be appreciated by one skilled in the art that other embodiments may be employed apart from these specific details. In some instances, detailed descriptions of well-known methods, nodes, interfaces, circuits, and devices are omitted so as not obscure the description with unnecessary detail. Those skilled in the art will appreciate that the functions described may be implemented in one or more nodes using hardware circuitry (e.g., analog and/or discrete logic gates interconnected to perform a specialized function, ASICs, PLAs, etc.) and/or using software programs and data in conjunction with one or more digital microprocessors or general purpose computers that are specially adapted to carry out the processing disclosed herein, based on the execution of such programs. Nodes that communicate using the air interface also have suitable radio communications circuitry. Moreover, the technology can additionally be considered to be embodied entirely within any form of computer-readable memory, such as solid-state memory, magnetic disk, or optical disk containing an appropriate set of computer instructions that would cause a processor to carry out the techniques described herein.

Hardware implementation may include or encompass, without limitation, digital signal processor (DSP) hardware, a reduced instruction set processor, hardware (e.g., digital or analog) circuitry including but not limited to application specific integrated circuit(s) (ASIC) and/or field programmable gate array(s) (FPGA(s)), and (where appropriate) state machines capable of performing such functions.

In terms of computer implementation, a computer is generally understood to comprise one or more processors, one or more processing modules or one or more controllers, and the terms computer, processor, processing module and controller may be employed interchangeably. When provided by a computer, processor, or controller, the functions may be provided by a single dedicated computer or processor or controller, by a single shared computer or processor or controller, or by a plurality of individual computers or processors or controllers, some of which may be shared or distributed. Moreover, the term "processor" or "controller" also refers to other hardware capable of performing such functions and/or executing software, such as the example hardware recited above.

Embodiments described herein relate to an optical module emulator and an emulator controller, both configured such that the emulator controller may monitor the control interface and the control signals for an optical module, as well as emulate the memory map of a given optical module along with timing emulation. This requires the transmitting of several additional signals compared to any previous solutions. For example, previously the control interface and control signals to the optical module were not emulated. However, electrical cables currently available, especially those designed for higher traffic rates, have a limited number of spare wires for emulator to control communications.

The option of using two electrical cables, one for data traffic and one for control interface and signaling, may not suitable due to the mechanical constraints of an optical module emulator. For example, the optical module emulator is likely to be required to use a Small For-Factor Pluggable (SFP) or Quad SFP (QSFP) shell in order to plug into the line card designed for the optical module at the host computer. There is therefore physically not enough space to use a second electrical cable to transmit the control interface and/or control signals. A single electrical cable may have several wires, some dedicated to carry data traffic (for instance, an SFP requires one transmitting data lane and one receiving data lane, while a QSFP requires four transmitting data lanes and four receiving data lanes) and two more serial data streams (clock+data) to carry the control interface and the control signals between the optical module emulator and the optical emulator controller.

The present embodiments therefore provide a communication protocol allowing for the transmission of the control interface and control signals using a single serial data stream from the optical module emulator to the emulator controller and a single data stream from the emulator controller to the optical module emulator.

This protocol limits the number of signals needed to carry the control interface and control signals from one end of the cable to the other.

FIG. 1 illustrates an optical module emulator 101 in a network 100. The optical module emulator has the form of a corresponding optical module 102, and when plugged into a host computer 103, emulates the optical module. For example, the optical module emulator may be a Small Form-factor Pluggable (SFP, SFP+, SFP 28), or a Quad SFP (QSFP, QSFP+, QSFP28) similarly to the optical module 102. In other words, the host computer 103 is unaware that the optical module 102 is not directly plugged into the host computer 103. An electrical cable 104 carries signals between the optical module emulator 101 and an emulator controller 105. The emulator controller 105 then passes the control interface and control signals to the optical module 102. The optical module 102 is, similarly to the host computer, therefore unaware that it is not plugged directly into the host computer 103. The host computer 103 may be considered as a processing node, e.g. for processing of radio data or other types of data.

The optical module emulator 101 and the emulator controller 105 utilize a protocol allowing for the transmission of the optical module control interface and the control signals from the host computer 103 to the optical module 102 in order to perform memory map and timing emulation of a particular optical module. This protocol may also allow for the transmission of the control interface and control signals 106 back from the optical module 102 to the host computer 103.

Figure 2:
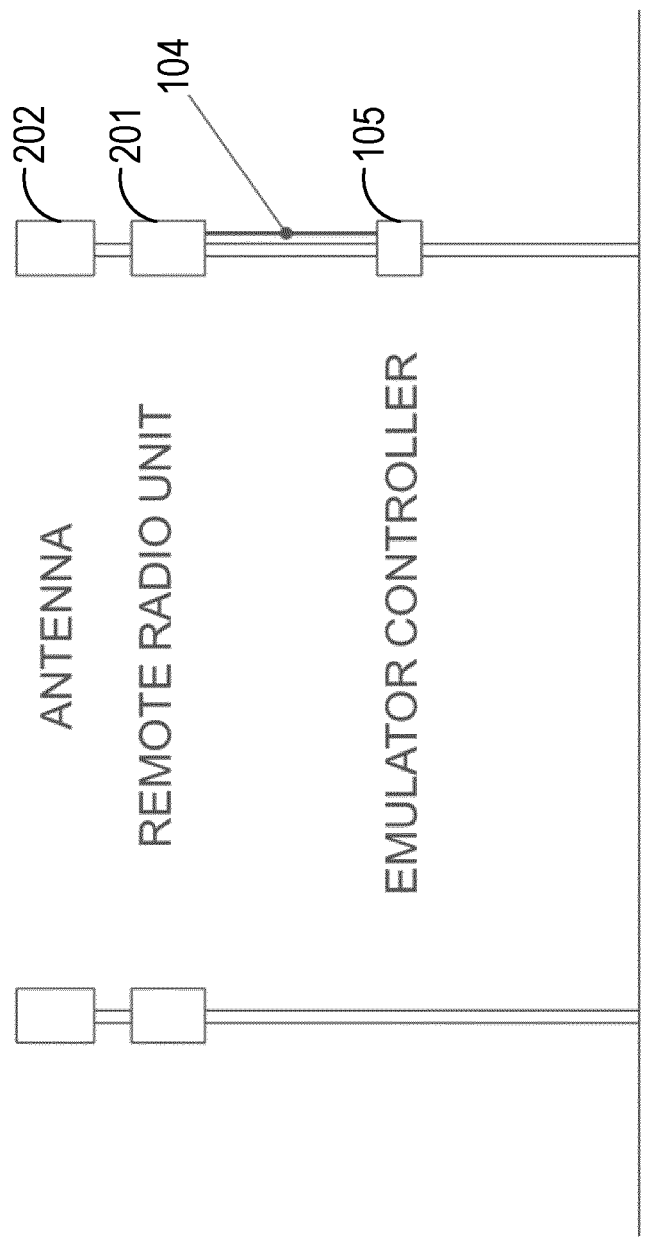
FIG. 2 illustrates an optical module emulator connected to a remote radio unit according to some embodiments.

Using such a protocol allows for improved serviceability. In other words, by replicating the physical control signals and the control interface at the emulator controller 105, the optical module 102 can be plugged in some distance away from the host computer 103. This may be very useful in scenarios such as that illustrated in FIG. 2, where the host computer is situated in a difficult to access location. In FIG. 2 the host computer comprises a remote radio unit (RRU) 201 connected to an antenna 202. However, in this example, the optical module emulator may be plugged into the host computer 103 and the optical module itself may be plugged into the emulator controller 105, which may be located further down the pylon, thus making the optical module more accessible. In some examples, the optical module and/or host computer are part of a radio access network, e.g. part of a base station. The elements of the base station (e.g. antenna, RRU and baseband processing unit) may be co-located, separated at the same location or geographically separated. The elements of the base station may be connected by optical connections, e.g. using an optical module as described herein.

One of the main problems in RRU maintenance in field is that the RRU may be mounted on a high pole near the antenna with its optical modules connected to the Radio Base Station (as in a passive Front Haul network) or from the Front Haul Unit (as in an active Front Haul network). When maintenance or network management is required it may therefore be necessary to replace the optical modules inside the RRU. In these circumstances it may have previously been necessary to use mechanical crane equipped with a basket to reach the optical module interface, with safety issues for the operators and additional costs for the rent of the crane. Instead, having the optical module situated some distance from the RRU lower down the pole, may be a suitable way to avoid current safety issues and the extra maintenance costs associated with the present setup.

Figure 3:
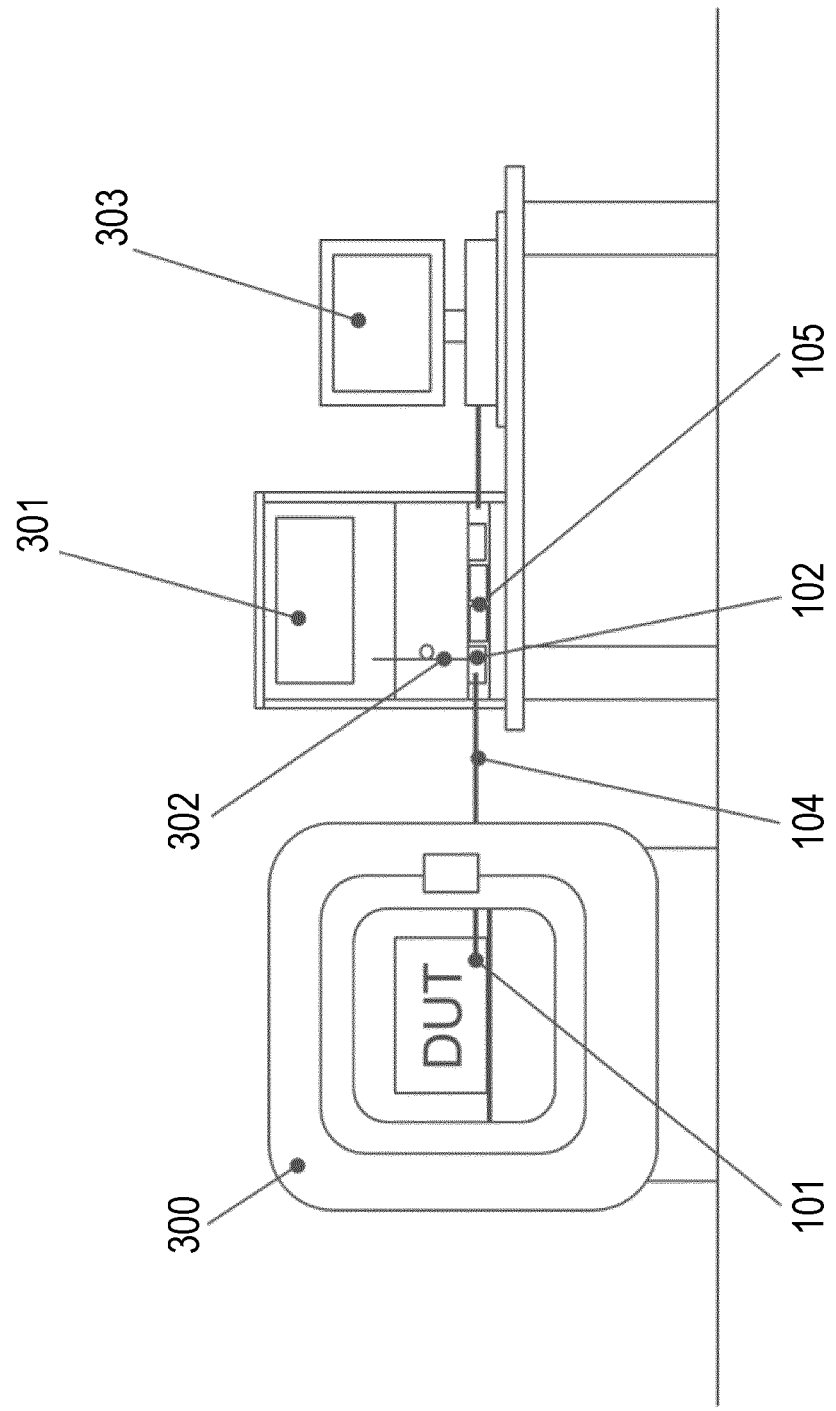
FIG. 3 illustrates an optical module emulator connected to a host computer in a thermal chamber according to some embodiments.

Furthermore, host computer validation may be improved as any thermal tests which may be required are simplified by allowing the optical module to be located outside of the thermal chamber as illustrated in FIG. 3.

For example, to validate a host computer thermal chamber tests at different thermal conditions may be performed with different optical modules plugged in. Previously, in order to change the optical modules, the thermal chamber would have to be opened and closed to change the optical modules plugged into the host computer. However, as illustrated in FIG. 3, using embodiments described herein means the optical module 102 may be plugged into the emulator controller 105 located outside of the thermal chamber 300. An electrical cable 104 may then connect the optical module 102 to the optical module emulator 101 which may then be plugged into the host computer 103 inside the thermal chamber 300. Therefore, to change the optical modules it may no longer be necessary to open and close the thermal chamber. The optical module may then be connected to an optical instrument 301 by an optical fiber 302. A controller graphical interface 303 may then monitor the performance of the host computer under different thermal conditions.

In addition, exporting the optical module control interface to the emulator controller allows the emulator controller to analyze the control interface at a much faster frequency rate when compared to previous solutions which may have used an I2C connection to emulate the control interface.

Furthermore, the addition of a control channel between the controller and the emulator allows for the implementation of more complex functionality at the emulator. For example, the emulator may perform power consumption emulation and timing emulation, making the emulator debug capabilities flexible for future needs.

Embodiments described herein also avoid the need for electrical traffic cable customizations. In other words, if the control interface were to be transmitted without using the proposed protocol, electrical cables may have to be customized in order to allow for the transmission of so many signals.

Figure 4:
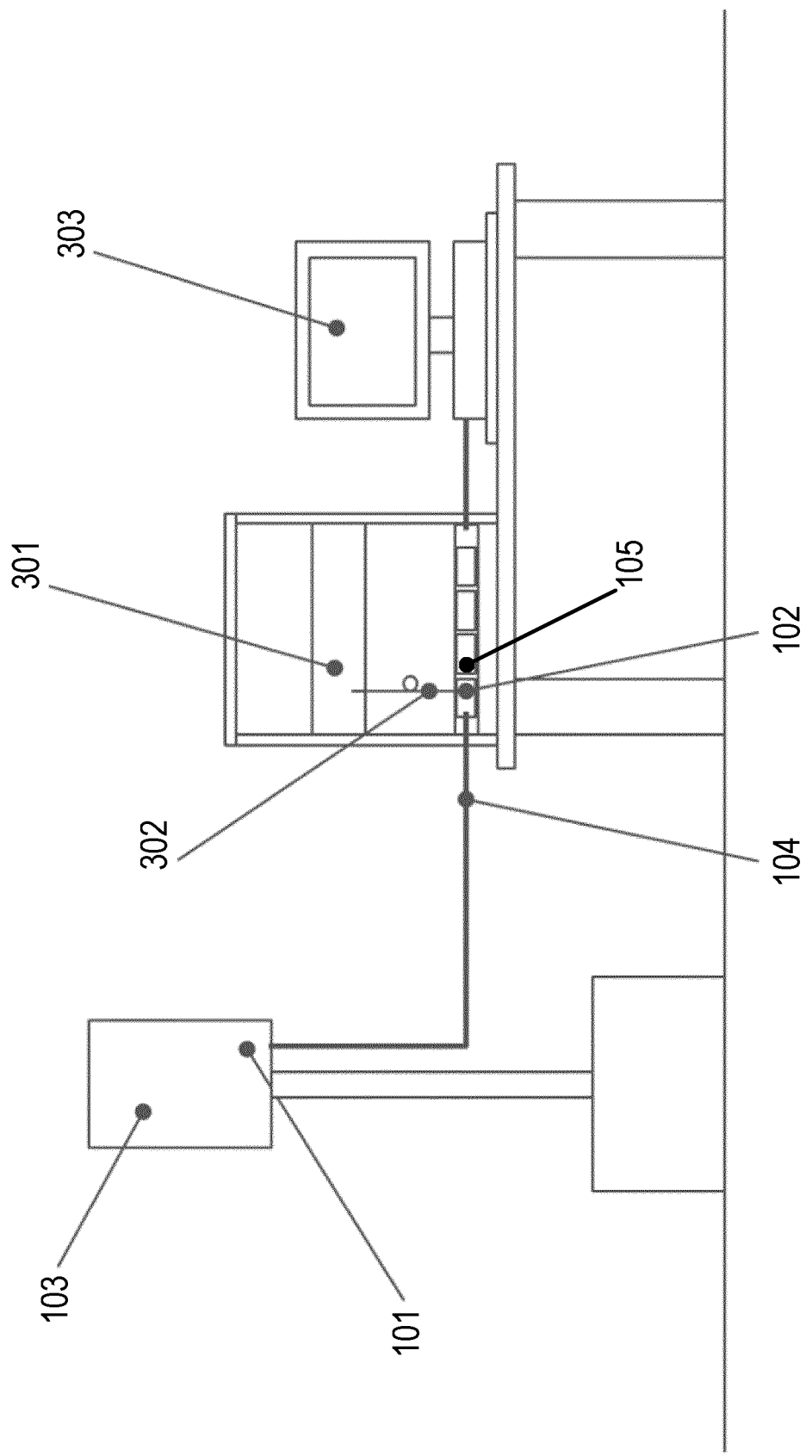
FIG. 4 illustrates an optical module emulator connected to a host computer for analysis of the control interface between the host computer and an optical modulator.

A further implementation of the embodiments described herein is for use in analysis of the control interface for newly developed optical modules, as illustrated in FIG. 4. In other words, for debugging purposes, it may be useful to catch the control signals and any other signals passed through the control interface between the host computer and the optical module. Therefore, by placing the optical module emulator 101 and the optical module controller 105 in-between the optical module 102 and the host computer 103, this allows for continuous monitoring of the signaling between the optical module 102 and the host computer 103.

The signals transmitted between the optical module and the host computer may be sampled at high frequency and by multiplexed in a specific order on a serial data stream (one per direction). These serial data streams may be transmitted along an electrical cable 104 connecting the two devices, the emulator controller 105 and the optical module emulator 101. A multi-frame alignment word (MFAW) comprising a sequence of multi-frame alignment bits may then be used to allow the device on the other end of the electrical cable to de-multiplex the signals and regenerate the optical module interface signals in a transparent manner.

Figure 5:
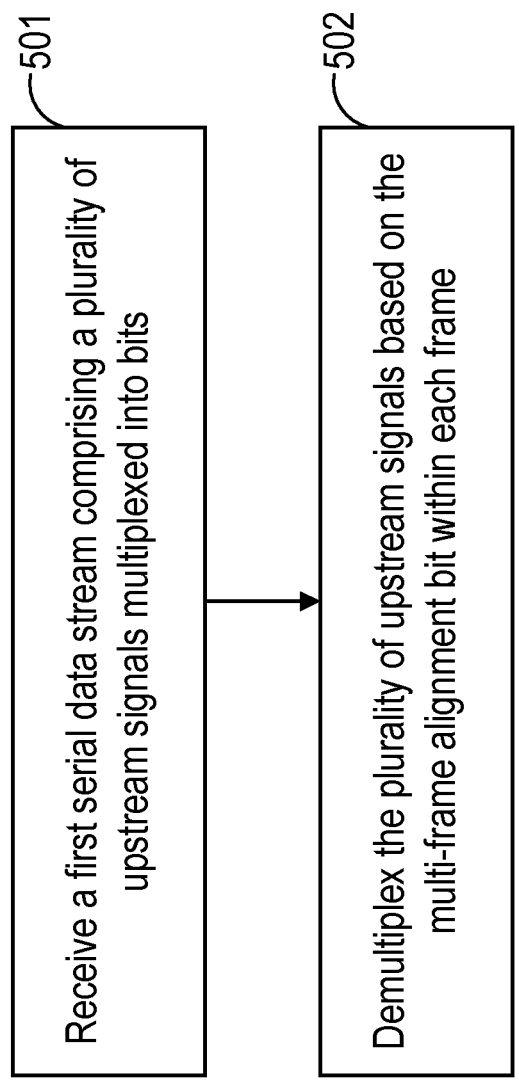
FIG. 5 illustrates a method, in an emulator controller for obtaining a plurality of upstream signals for transmission to an optical module.

FIG. 5 illustrates a method, in an emulator controller for obtaining a plurality of upstream signals for transmission to an optical module. In step 501 the emulator controller receives, from an optical module emulator, a first serial data stream comprising the plurality of upstream signals multiplexed into a plurality of bits.

The first data stream may therefore comprise sampled upstream control interface signals originating from the optical module emulator. For example, these upstream control interface signals may comprise a control interface between the emulator and the emulator controller, or may comprise a control interface between the host computer and the optical module. In some embodiments, the plurality of upstream signals comprise two or more of the following: serial control data transmitted from the host computer to the optical module; a serial control clock transmitted from the host computer to the optical module; serial control data transmitted between the optical module emulator to the emulator controller; a serial control clock transmitted between the optical module emulator and the emulator controller; and control signals transmitted from the host computer to the optical module.

These plurality of upstream signals are interleaved within each frame in the first serial data stream, along with a multi-frame alignment bit. The first data stream may therefore comprise a plurality of frames, each frame comprising a multi-frame alignment bit. The emulator controller may then de-multiplex, in step 502, the plurality of upstream signals based on the multi-frame alignment bit within each frame.

Each multi-frame alignment bit may comprise a bit from a predetermined multi-frame alignment word, MFAW, wherein the predetermined MFAW may comprise a sequence of N bits, as described in more detail with reference to FIG. 7.

Figure 6:
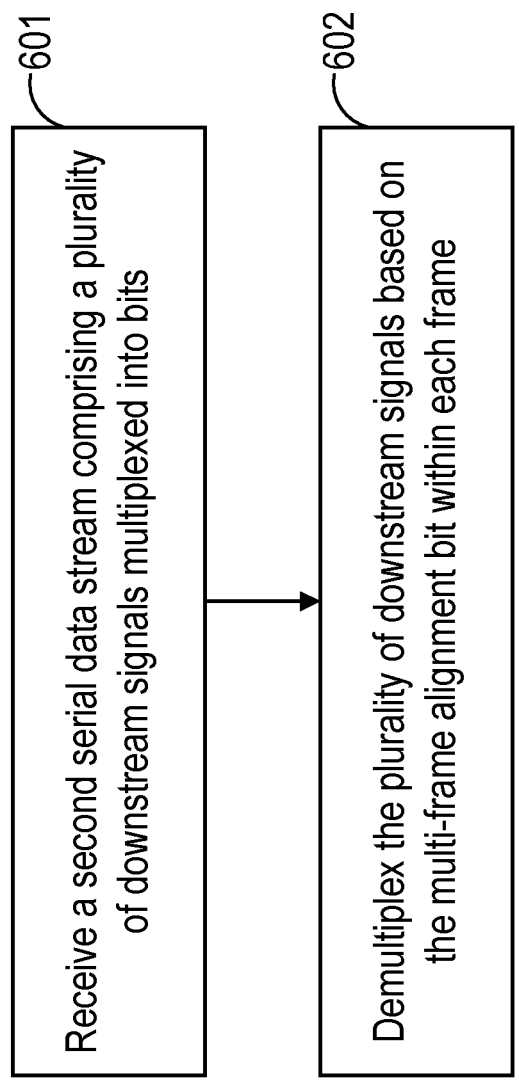
FIG. 6 illustrates a method, in an optical module emulator, for obtaining a plurality of downstream signals transmitted by an emulator controller.

FIG. 6 illustrates a method in an optical module emulator, for obtaining a plurality of downstream signals transmitted by an emulator controller. In step 601 the optical module emulator receives from an emulator controller, a second serial data stream comprising the plurality of downstream signals multiplexed into a plurality of bits.

The second data stream may therefore comprise sampled downstream control interface signals originating from the emulator controller. For example these downstream control interface signals may comprise a control interface between the emulator controller and the optical module emulator, or may comprise a control interface between the optical module and the host computer. In some embodiments, the plurality of downstream signals comprise one or more of the following: serial control data transmitted from the optical module to the host computer; a serial control clock transmitted from the optical module the host computer; serial control data transmitted between the emulator controller to the optical module emulator; a serial control clock transmitted between the emulator controller and the optical module emulator; and control signals transmitted from the optical module to the host computer.

This plurality of downstream signals are interleaved within each frame in the second serial data stream, along with a multi-frame alignment bit. Therefore, the second serial data stream comprises a plurality of frames, each frame comprising a multi-frame alignment bit. The optical module emulator may then de-multiplex, in step 602, the plurality of downstream signals based on the multi-frame alignment bit within each frame. Each multi-frame alignment bit may comprise a bit from a predetermined multi-frame alignment word, MFAW, wherein the predetermined MFAW may comprise a sequence of N bits, as described in more detail with reference to FIG. 7.

Figure 7:
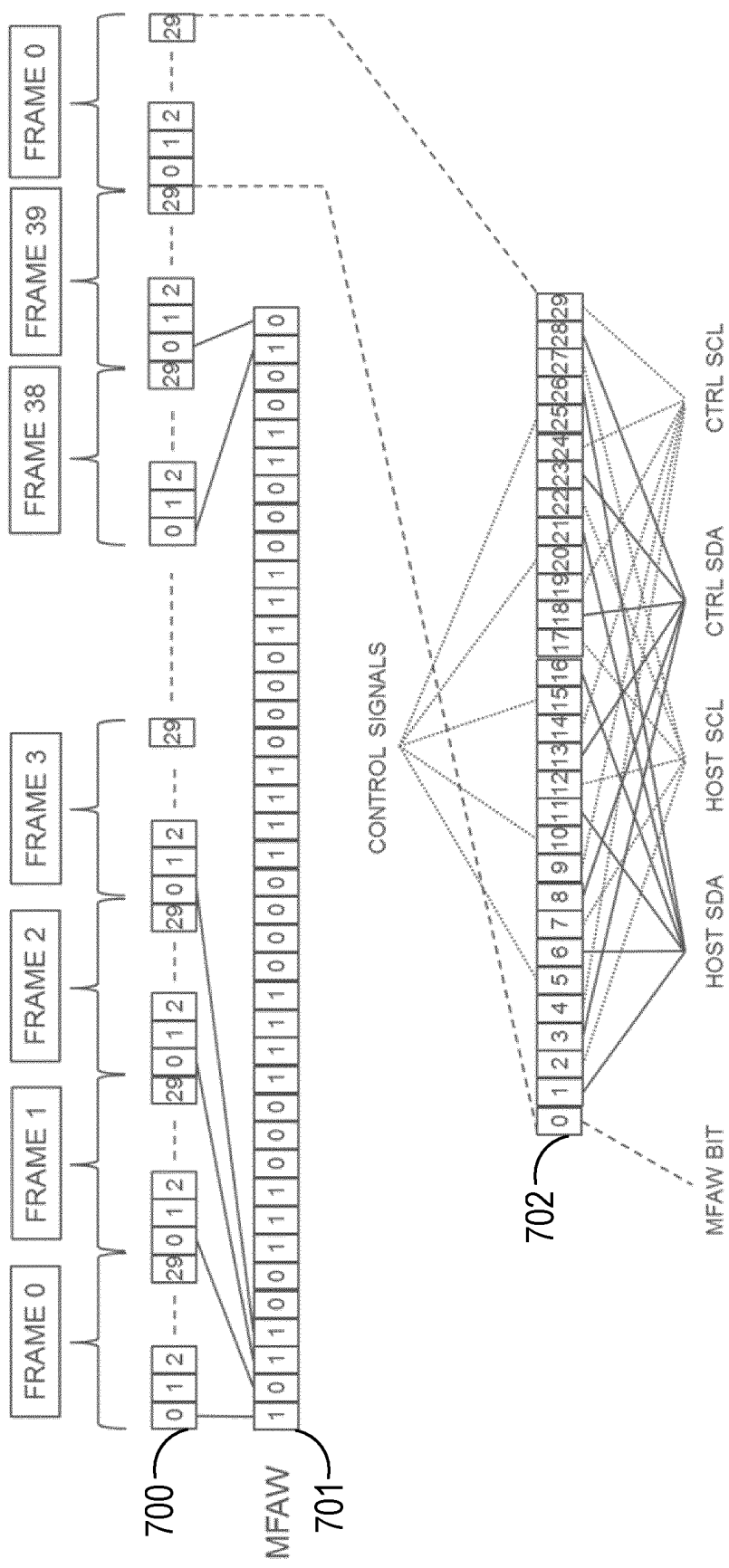
FIG. 7 illustrates an example of a protocol for the transmission of a plurality of upstream or downstream signals between an optical module emulator and an emulator controller.

FIG. 7 illustrates an example of a protocol for the transmission of a plurality of upstream or downstream signals between an optical module emulator and an emulator controller.

The signals which may be required to be transmitted between the optical module emulator and the emulator controller may comprise: control interface signals between the host computer and the optical module, this may include a control clock (SDA) and a control data (SDA) signal; control signals from the host computer to the optical module, (in some examples this may comprise up to 3 signals); control signals from the optical module to the host computer (in some examples this may comprise up to 3 signals); the control interface signals between the emulator controller and the optical module emulator, this may include a control clock (SCL) and a control data (SDA) signal; control signals between the emulator controller and the optical module emulator (in some examples this may comprise up to 2 signals); and control signals between the optical module emulator and the emulator controller (in some examples this may comprise up to 2 signals).

In some embodiments, a control interface signal may be sampled multiple times per frame in order to limit as much as possible the delay introduced by the multiplexing and de-multiplexing in both directions.

For example, a frame may comprise M bits, comprising a sequence of interleaved samples of control signals and control interface signals. Each bit has a position with the frame, and this position within the frame may be illustrated by the bit number within the frame, as shown by the numbered bits 700 in FIG. 7. For example, position M−1 is the final bit within each frame, and position 0 is the first bit within each frame. In the example of FIG. 7 each frame comprises 30 bits.

A predetermined position within each frame may be populated by a multi-frame alignment bit from a MFAW. The optical module emulator or emulator controller may then locate the MFAW within the first serial data stream or second serial data stream respectively, and from the predetermined position within each frame that the MFAW populates, determine the position of the bits of the frames within the respective first and second serial data streams.

In this example, the MFAW 701 comprises a predetermined sequence of N bits as follows: 1011001110001111000011110000111000110010. Therefore in this example, N, the number of bits in the MFAW, is equal to 40. In this example, each of these multi-frame alignment bits populates a predetermined position in each frame, which, in the example illustrated in FIG. 7 is position 0. Therefore the first bit of the first frame is 1, the first bit of the second frame is 0, the first bit of the third frame is 1, and so on for every bit of the MFAW. Each consecutive group of 40 frames may repeat this pattern with the predetermined position in each frame comprising a multi-frame alignment bit.

In the example illustrated in FIG. 7, each multi-frame alignment bit from the MFAW populates the first bit in each frame, i.e. position 0. However, it will be appreciated that the multi-frame alignment bit may populate any position within each frame. Furthermore, each multi-frame alignment bit may populate a different position within each frame. The predetermined position populated by each bit of the MFAW may be known by both the optical module emulator and the emulator controller. In this way, the emulator controller may locate the MFAW in the first serial data stream, and the optical module emulator may locate the MFAW in the second serial data stream. It will be appreciated that in some embodiments different MFAWs may be used for the upstream and downstream directions. By locating the MFAW in a data stream the optical module emulator or emulator controller may determine the positions of the bits of the frames within the received data stream, and may therefore de-multiplex the received signals correctly.

FIG. 7 illustrates an example frame 702 which illustrates the multiplexing of the control interface and control signals into a single frame. If for example M is equal to 30, as in the example frame 702, the signals in the downstream emulator controller to optical module emulator direction may be interleaved as follows: Bit 0 may be the downstream multi-frame alignment bit, bits 1, 6, 11, 16, 21 and 26 may be the sampled optical module to host computer control data, bits 2, 7, 12, 17, 22 and 27 may be the sampled optical module to host computer control clock; bits 3, 8, 13, 18, 23, 28 may be the sampled emulator controller to optical module emulator control data; bits 4, 9, 14, 19, 24, 29 may be the sampled emulator controller to optical module emulator control clock; and bits 5, 10, 15, 20, 25 may be the optical module to host computer control signals.

The signals in the upstream optical module emulator to emulator controller direction may be interleaved as follows:

Bit 0 may be the upstream multi-frame alignment bit, bits 1, 6, 11, 16, 21 and 26 may be the sampled host computer to optical module control data, bits 2, 7, 12, 17, 22 and 27 may be the sampled host computer optical module control clock; bits 3, 8, 13, 18, 23, 28 may be the sampled optical module emulator to emulator controller control data; bits 4, 9, 14, 19, 24, 29 may be the sampled optical module emulator to emulator controller control clock; and bits 5, 10, 15, 20, 25 may be the host computer to optical module control signals.

It will be appreciated that the signals, and the multi-frame alignment bit, may be interleaved within a frame in any suitable manner. The positions which each signal populates within a frame may be known to the emulator controller and to the optical module emulator. In some examples, the upstream signals and downstream signals may be multiplexed in a different manner.

In this example, each of the control interface signals is sampled 6 times per frame in order to compensate for the delay caused by multiplexing and de-multiplexing the signals. As such, a frame may comprise a plurality of samples of a particular control interface signal.

In some embodiments the protocol may also comprise including at least one parity bit in each frame. In some embodiments, each frame comprises one parity bit every 5 bits, wherein each parity bit reports the parity of the bits between one parity bit and the following one, for example the parity of the preceding 5 bits. These parity bits may then be used for bit error detection and to avoid unwanted glitches in the de-multiplexed signals.

In some embodiments, the parity bits may be distributed evenly over each frame, which introduces a deterministic latency in the multiplexing/de-multiplexing of the signals.

In this example, the emulator controller acts as the protocol master, providing the optical module emulator with a system clock and transferring all the information in the downstream direction in form of a second serial data stream.

The optical module emulator may then use the system clock to extract the downstream signals received from the emulator controller over in the second serial data stream, recognizing the positions of the bits of the frames in the second serial data stream by locating the multi-frame alignment word (MFAW), which, in this example, comprises 1 bit per frame and repeats every N frames (see example in FIG. 7, where for instance N is equal to 40).

Figure 8:
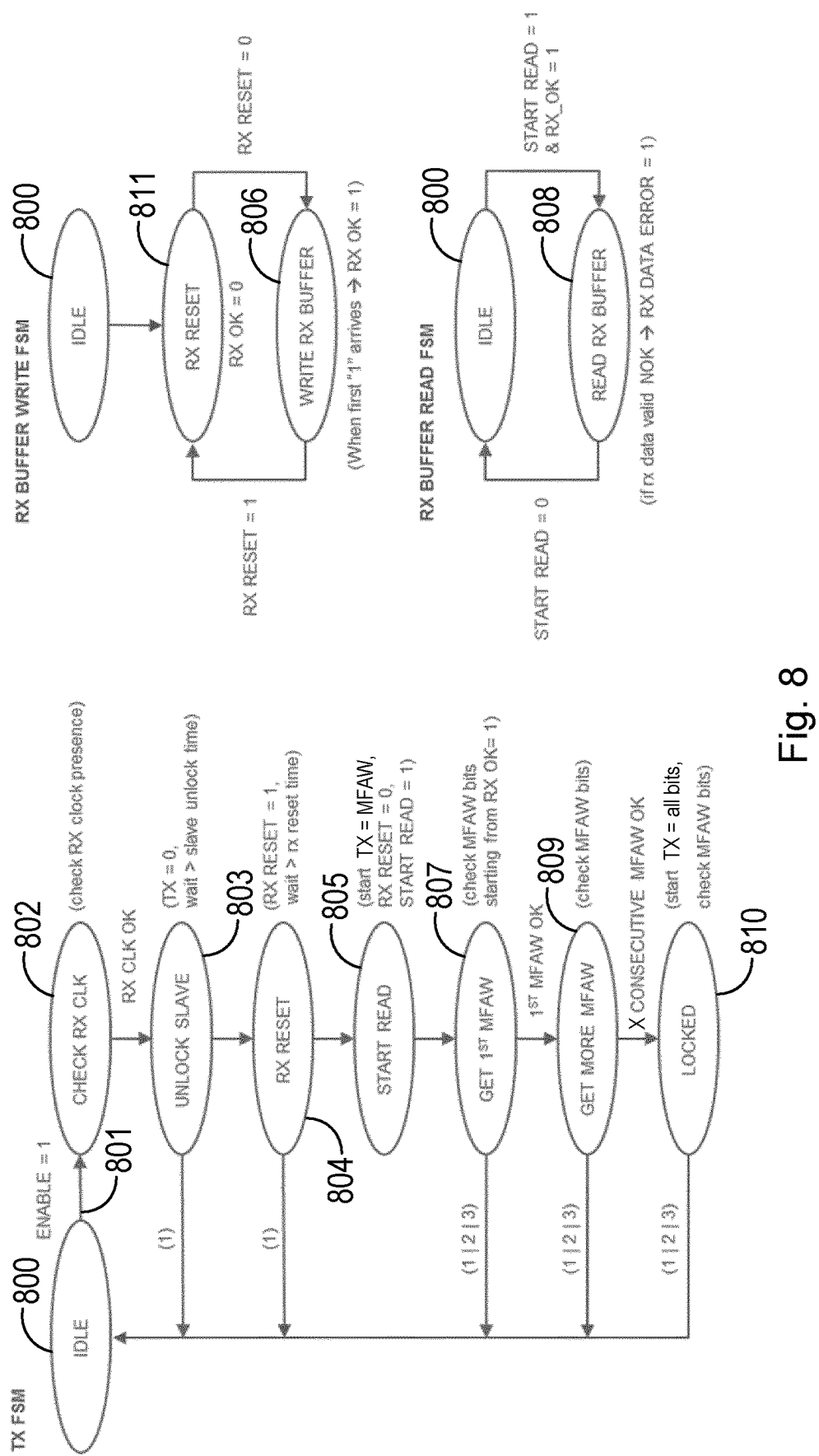
FIG. 8 illustrates an example of a method performed by an emulator controller according to some embodiments.

FIG. 8 illustrates an example of a method performed by an emulator controller according to some embodiments.

In step 801 the emulator controller moves from an idle mode into an active mode in order to transmit downstream data to the optical module emulator. This may occur in response to receiving downstream data signals from an optical module which are intended for a host computer to which the optical module emulator is connected. This may set the state value ENABLE to 1. The value ENABLE indicates whether the emulator controller is in an idle mode i.e. ENABLE=0, or an active mode i.e. ENABLE=1.

In some examples, the ENABLE signal may be generated by a microprocessor hosted by the emulator controller. This may means that software running on the emulator controller may decide to enable the protocol in response to a variation of a presence signal from the optical module 102. However, in some examples, the protocol may always be enabled with ENABLE=1 such that the process may automatically restart if forced into IDLE mode. In some examples, ENABLE may be set to 0 for debugging purposes to force realignment.

Once in an active mode, the emulator controller may first transmit a control system clock to the optical module emulator in step 802. The optical module emulator, upon receiving the system clock, may re-transmit the control system clock back to the emulator controller, to confirm that it is present.

Once the emulator controller has received the optical module emulator to emulator controller system clock, it may unlock the optical module emulator, in step 803, and may wait a predetermined slave unlock time in order for the optical module emulator to be ready to receive a second data stream. During this time, further transmissions may not be made by the emulator controller, and the state value TX may be set to 0. The state value TX indicates whether any information is being transmitted downstream by the emulator controller to the optical module emulator. When TX=0 no information is being transmitted. When TX=MFAW only MFAW bits are being transmitted, and when TX=all bits, MFAW and downstream signals are being transmitted.

After this predetermined slave unlock time, the emulator controller may enter a reset state RX RESET, in step 804, which sets an internal signal RX RESET to 1. The internal signal RX RESET being set to 1 forces a receive buffer which configured to store incoming data received from the optical module emulator into a reset state RX RESET in step 811. The resetting of the receive buffer may clear the receive buffer ready for receiving any information from the optical module emulator. In this example, after the slave unlock time, the internal signal RX RESET is set to 1, which causes the receive buffer to reset. When RX RESET is set to 0 the emulator controller is configured to start writing to the receive buffer. In this example the internal signal RX OK, which switches to 1 when a toggle is received on an upstream data stream, is set to 0 when the receive buffer is reset in step 811.

The use of this receive buffer allows for resampling the receive first serial data stream from the optical module emulator using the emulator controller system clock, whilst ensuring enough of a setup/hold margin despite the different phase relationships between optical module system clock and the emulator controller system clock, which are identical but for a phase relationship which may be caused by a round trip delay time in transmitting the system clock to the optical module emulator over the electrical cable.

After a predetermined RX RESET time, the emulator controller may then start transmitting, in step 805, the MFAW to the optical module emulator. For example, the state value TX may be set to MFAW. In some examples, the emulator controller may transmit the MFAW in a second data stream to the optical module emulator by populating the predetermined position in each of N frames with consecutive bits of the MFAW. Initially, the remaining bits in each frame which are not populated by a multi-frame alignment bit may be all set to either 1 or 0. In this example therefore, the emulator controller may not commence transmitting the downstream data signals until it has confirmation that the optical module emulator has located the MFAW in the second serial data stream. As only the MFAW bits are transmitted at this stage, this means that, during hardware debugging, the MFAW pattern may be easily recognized by probing the first data stream with an oscilloscope.

In some examples therefore, before the emulator controller locates the MFAW in the first serial data stream, all bits not populated by one of the sequence of N bits in the second serial data stream have a value of 1. Alternatively, all bits in not populated by one of the sequence of N bits in the second data stream have a value of 0.

Also at step 805, the internal signal RX RESET is set to 0 and the buffer may start to write the received upstream data to the receive buffer in step 806. In step 806, the receive buffer, which runs in an upstream clock domain after a reset in step 811, starts writing at address 0 until a bit causing a toggle on the first serial data stream is received. When the bit causing a toggle is received, the internal signal RX_OK is set to 1 and the receive buffer increases the write address for next write. Also, at each write a datavalid flag may be toggled in another ring buffer that is the same size of receive buffer. The emulator controller may check the datavalid flag each time a received data bit is read, so that if upstream clock stops, the datavalid flag may not be updated and the emulator controller may set an internal signal RX_DA-TA_ERROR to 1, forcing the emulator controller into the IDLE state in step 800.

The emulator controller may also be set to prepare to read from the receive buffer using the downstream clock by setting the internal signal START READ to 1. However, the emulator controller may not commence reading from the receive buffer until the internal signal RX OK has been set to 1. In other words, the emulator controller may only start reading from the receive buffer once a toggle has been received on the first serial data stream from the optical module emulator. RX OK may be resampled using the downstream clock to ensure a delay between the writing and reading of the receive buffer. As described above, at each read from the receive buffer the emulator controller may also check a datavalid flag in another ring buffer, and if the datavalid flag is not updated an internal signal RX_DA-TA_ERROR may be set to 1, forcing the emulator controller into IDLE state in step 800.

In step 807, the emulator controller may attempt to locate a MFAW in the first serial data stream. For example, the emulator controller may receive a first bit causing a toggle on the first serial data stream from the optical module emulator. This means that the optical module emulator is sending information to the emulator controller. In other words, the first serial data stream may have previously comprised all 0's, and a 1 is received, or the first data stream had previously comprised all 1's, and a 0 is received. In some examples, the emulator controller may then set the internal signal RX OK to 1 and may commence reading from the receive buffer in step 808.

The emulator controller may then check that the first serial data stream comprises a correct MFAW in step 807. To do this, the emulator controller may set the bit which caused the toggle as the first bit of the MFAW in a first frame of N consecutive frames. The position of this first bit of the MFAW within the first frame may be set as the predetermined position within the first frame. The emulator controller may then determine whether bits populating the predetermined position in the following N−1 consecutive frames of the first serial data stream match the sequence of N bits in the MFAW.

In the example of FIG. 7 therefore, the emulator controller may set the bit causing the toggle as the first bit of frame 0, and may check that the first bit of the following 39 frames matches the corresponding bit of the 40 bit MFAW.

Responsive to a determination that the bits populating the predetermined position within the following N−1 consecutive frames of the first serial data stream match the sequence of N bits, the emulator controller may determine that it has received a correct MFAW may move to step 809. If one of the bits populating the predetermined position within the following N−1 consecutive frames of the first serial data stream does not match the MFAW, the method may return to IDLE mode in step 800. Returning to IDLE mode may set the internal signal START READ to 0. Returning to IDLE mode may also comprise repeating the step of locating the MFAW.

If the emulator controller determines that it has received a correct MFAW, it may continue to check further frames in the first serial data stream to check that more MFAWs are received correctly in step 809. For example, in some embodiments the emulator controller may check to receive X further correct MFAWs in step 809, where X is an integer number. In some examples X may be 4. It will be appreciated that in some embodiments X may be 0. In other words, it may not be required that the emulator controller wait to receive any further correct MFAWs.

Responsive to X further MFAWs not being received correctly the method may return to IDLE mode in step 800. However, as ENABLE may be set to 1, the process may automatically restart when the method returns to IDLE mode in step 800.

Responsive to X further correct MFAWs being received correctly, the emulator controller may determine that the optical module emulator has received a correct MFAW in the second data stream, and may therefore determine that the optical module emulator is ready to receive downstream signals. Therefore, in step 810, the value TX may be set to all bits, and the emulator controller may start transmitting the downstream signals to the optical module emulator multiplexed with the multi-frame alignment bits as illustrated in FIG. 7.

To transmit the downstream signals, the emulator controller may sample the plurality of downstream signals, and multiplex the plurality downstream signals such that each sample populates a bit in the second serial data stream.

At this stage, the emulator controller is now also locked onto the phase of the first serial data stream received form the optical module emulator, in step 810, and may therefore commence de-multiplexing the upstream signals according to a protocol, for example as illustrated in FIG. 7. The emulator controller may then, in some examples, transmit the de-multiplexed upstream signals to an optical module.

Figure 9:
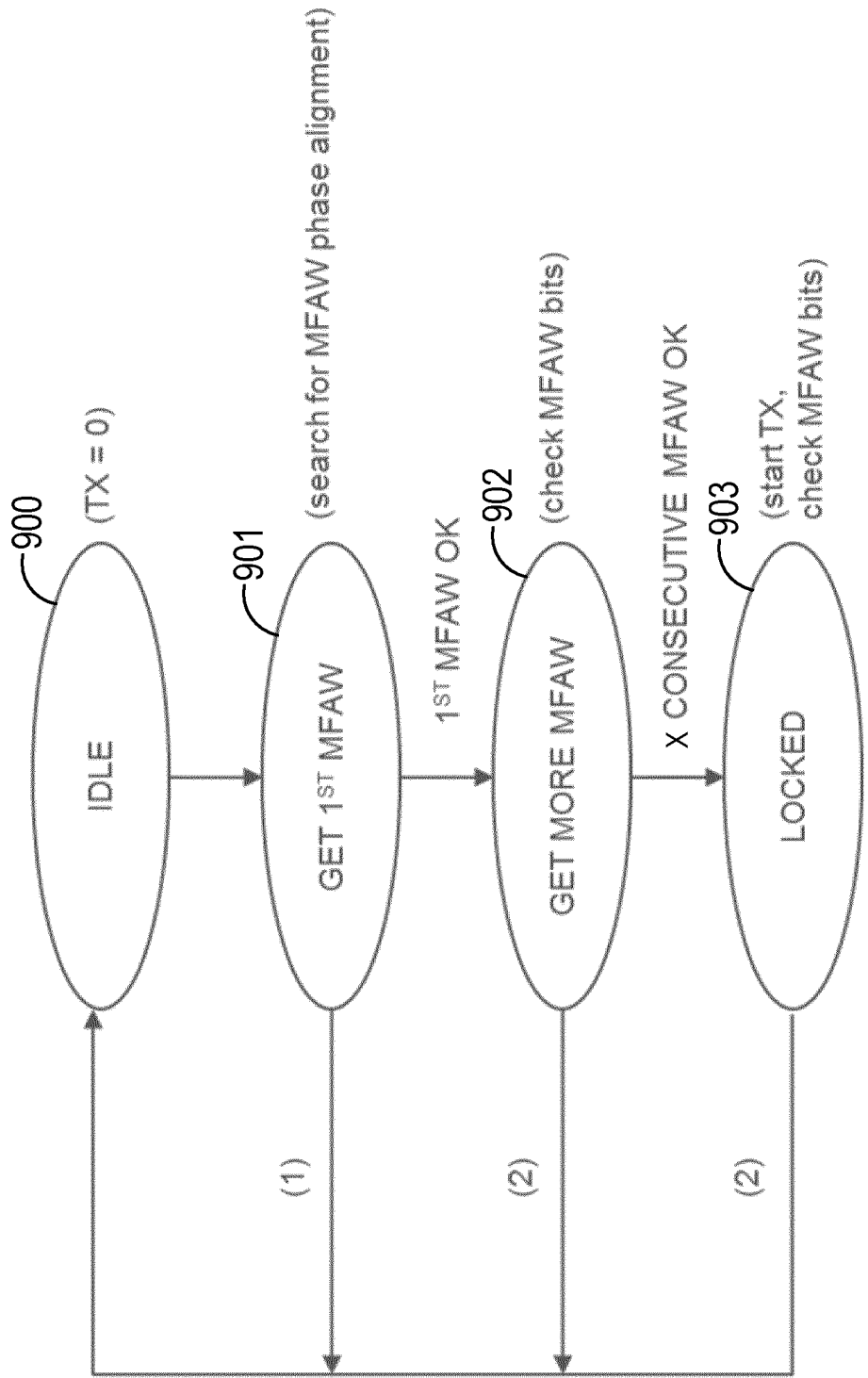
FIG. 9 illustrates an example of a method performed by an optical module emulator according to some embodiments.

FIG. 9 illustrates a method, in an optical module emulator according to some embodiments.

In some embodiments, the optical module emulator may first receive a control system clock from the emulator controller, and may transmit a re-transmission of the control system clock back to the emulator controller to confirm to the emulator control that the optical module emulator is present.

The optical module emulator may then start in IDLE mode, in step 900, and may proceed to step 901.

The optical module emulator may be transmitting in the first serial data stream all 0's or all 1's until it locates a MFAW in the second serial data stream transmitted downstream from the emulator controller. At the start of the method a state value TX is therefore set to 0, indicating that no information is being transmitted in the first serial data stream.

In step 901, the optical module emulator starts receiving information on the second serial data stream and starts to attempt to locate a MFAW in the second serial data stream. This may occur in response to the emulator controller reaching step 805 in the method illustrated in FIG. 8.

The optical module emulator may be configured to locate the predetermined MFAW by setting a candidate for a multi-frame alignment bit as the first bit of the MFAW in a first frame of N consecutive frames. The optical module emulator may then set the position of the first bit as the predetermined position within the first frame; and may determine whether bits populating the predetermined position in a following N−1 consecutive frames of the second serial data stream match the sequence of N bits.

For example, the optical module emulator may place the candidate for a multi-frame alignment bit and all subsequent bits populating the predetermined position of the following consecutive N−1 frames into a shift register N bits wide. This shift register may be compared with the expected predetermined MFAW. If the bits in the shift register do not match the predetermined MFAW, the shift register may be shifted along one bit, and a new bit populates the end of the shift register. The new bit may be taken from the predetermined position in the $N^{th}$ frame of the second serial data stream. The shift register may then be compared to the MFAW again. This process may be repeated until the shift register matches the predetermine MFAW. In some embodiments, this process may be repeated up to 2*N times, such that if the candidate for a multi-frame alignment bit was from a frame that was not the first of the multi-frames comprising a complete MFAW, the MFAW may still be located by repeating the process of shifting the shift register 2*N times. If the optical module emulator is unable to locate a MFAW, the optical module emulator may return to IDLE mode.

Responsive to a determination that bits populating the predetermined frame position in the following N−1 consecutive frames of the second serial data stream match the sequence of N bits, the optical module emulator may determine that a correct MFAW has been received in the second serial data stream.

If the optical module emulator is able to locate a MFAW the method may pass to step 902 in which the optical module emulator checks the second serial data stream for further MFAWs. In some embodiments, the optical module emulator may be required to receive X consecutive MFAWs before transmitting upstream signals to the emulator controller in step 903.

If a bit failure occurs, for example one bit of a MFAW in the X consecutive MFAWs is incorrect, the method may pass back to IDLE mode in step 900.

If all X consecutive MFAWs are received correctly by the optical module emulator, the method may pass to step 903 in which the optical module emulator may start transmitting upstream signals multiplexed into a first serial data stream with a MFAW, for example as illustrated in FIG. 7. In this way the optical module emulator locates the predetermined MFAW by determining that a correct MFAW has been received in the second serial data stream before transmitting the first serial data stream to the emulator controller.

For example, the optical module emulator may generate a first serial data stream comprising a plurality of upstream signals; wherein the first data stream comprises plurality of frames. To do this, the optical module emulator may position, in the first serial data stream, predetermined multi-frame alignment bits in each respective frame; sample a plurality of upstream signals to be transmitted to the emulator controller; multiplex the sampled plurality of upstream signals into remaining bits of first serial data stream; and transmit the first serial data stream to the emulator controller.

Once both the optical module emulator has reached step 903 and the emulator controller has reached step 810, the control interface and the control signals between the optical module emulator and the emulator controller may be transferred in real time, being multiplexed at the system clock rate at one side and de-multiplexed at the same rate at the other.

In case of errors in upstream MFAW bit checking, the controller may be configured to stop transmitting downstream data for a while (to force the emulator to unlock as well), which may start the alignment process from the beginning.

Figure 10:
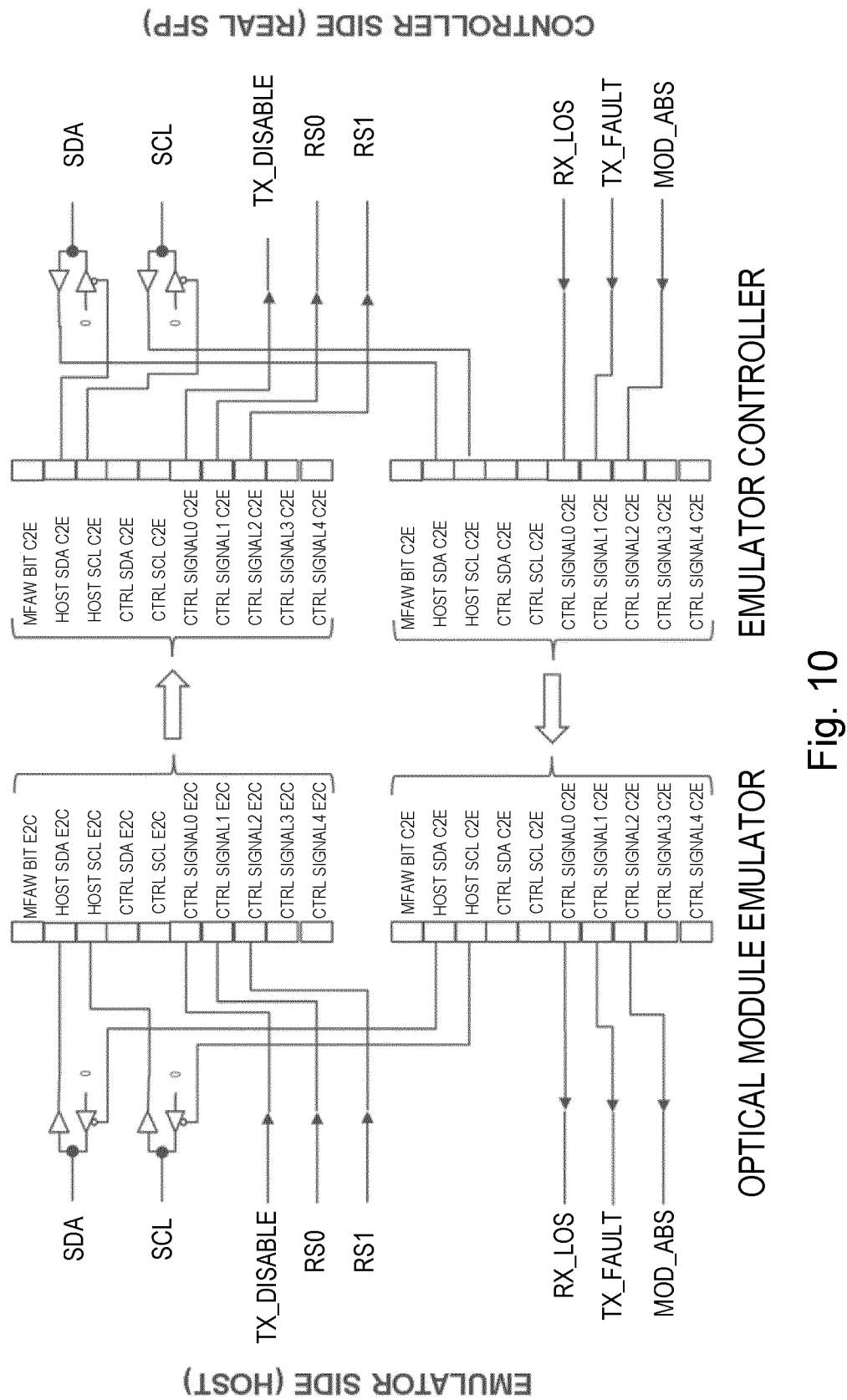
FIG. 10 illustrates an example for an SFP/SFP+/SFP28 type optical module emulator implementation for transmitting control interface and control signals between a host and an optical module.

FIG. 10 illustrates an example for an SFP/SFP+/SFP28 type optical module emulator implementation for transmitting control interface and control signals between a host and an optical module.

The control interface signals transmitted by the optical module emulator to the emulator controller comprise the signals SDA and SCL. The control signals transmitted by the optical module emulator to the emulator controller comprise for example, the control signals TX_DISABLE which turns off the transmitter laser output, RS0 which may be an input hardware pin which optionally selects the optical receive data path rate coverage for an SFP+ module, and RS1 which may be an input hardware pin which optionally selects the optical transmit path data rate coverage for an SFP+ module.

The control interface received at the emulator and transmitted by the emulator controller comprises the signals SDA and SCL. The control signals received from the emulator controller comprise for example, the signals RX_LOS which when high may indicate an optical signal level below that specified in a relevant standard, TX FAULT which is a module output pin that when high, indicates that the module transmitter has detected a fault condition related to laser operation or safety, and MOD_ABS which may be "High" when the SFP+ optical module is physically absent from a host slot.

Figure 11:
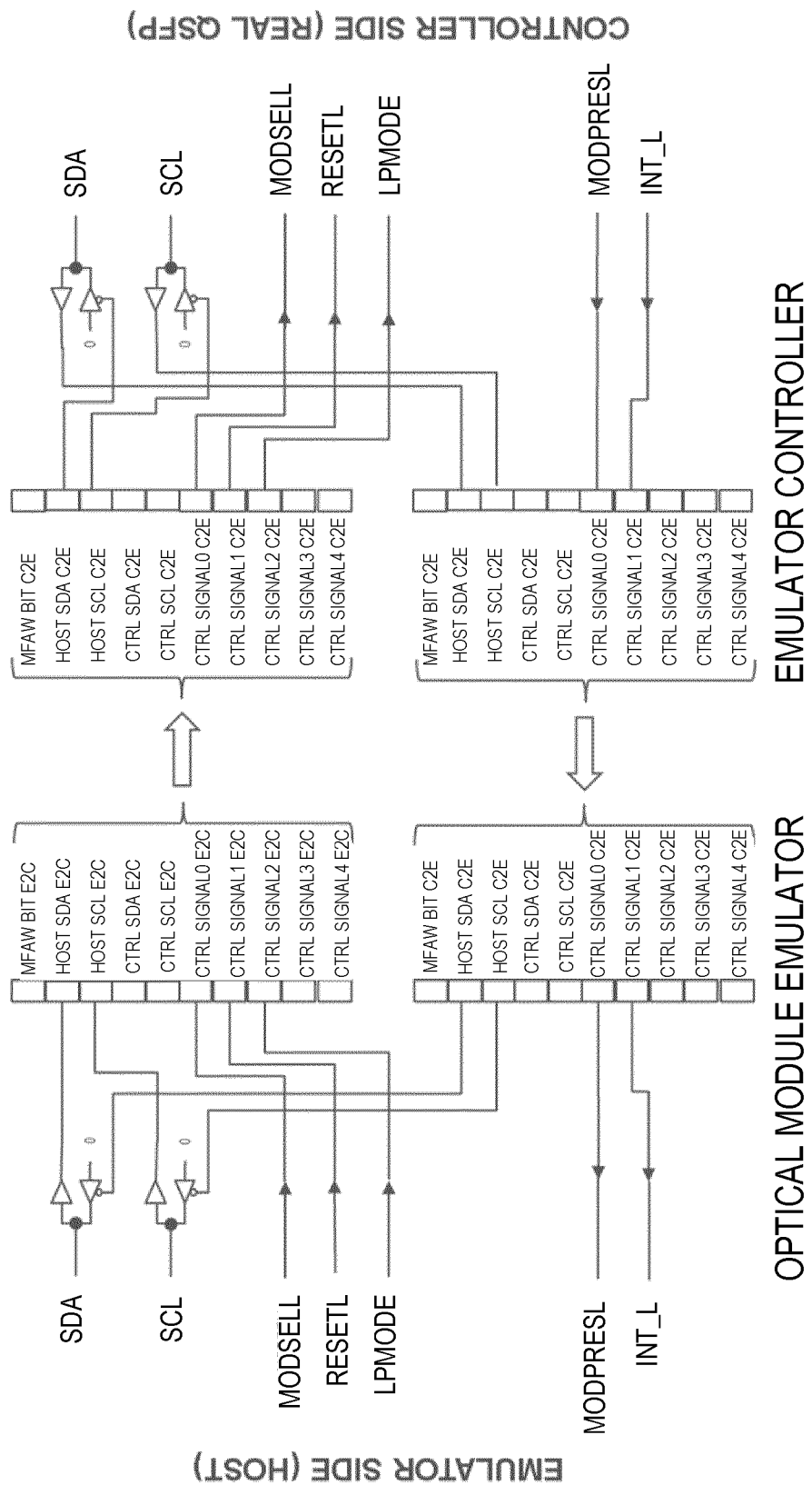
FIG. 11 illustrates an example for a QSFP/QSFP28 type optical module emulator implementation for transmitting control interface and control signals between a host and an optical module.

FIG. 11 illustrates an example for a QSFP/QSFP28 type optical module emulator implementation for transmitting control interface and control signals between a host and an optical module.

The control interface signals transmitted by the optical module emulator to the emulator controller comprise the signals SDA and SCL. The control signals transmitted by the optical module emulator to the emulator controller comprise for example, the control signals MODESELL which when held low by the host may cause the optical module to respond to 2-wire serial communication commands, RESETL which enables a complete reset by returning the settings to their default state when a low level on the RESETL pin is held for longer than a minimum pulse length, and LPMODE which may be used to set the maximum power consumption for the optical module in order to protect hosts that are not capable of cooling higher power optical modules.

The control interface received at the optical module emulator and transmitted by the emulator controller comprises the signals SDA and SCL. The control signals received at the optical module emulator from the emulator controller may comprise for example, the signals MODPRESL which when high may indicate that an optical module is not present, and INT_L which when low may indicate a possible operational fault or a status critical to the host system.

Figure 12:
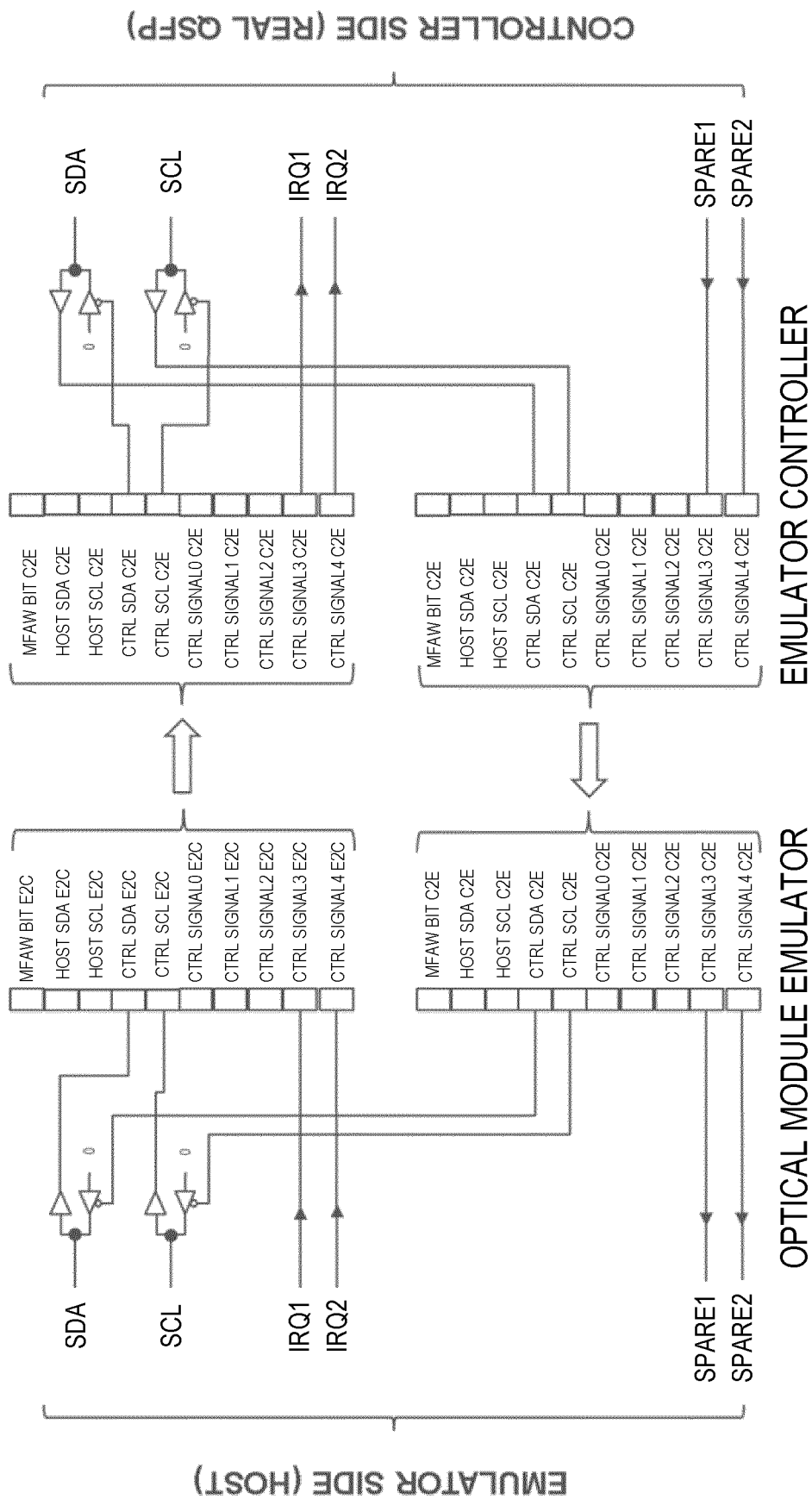
FIG. 12 illustrates an example for control channel implementation for controlling the optical module emulator.

FIG. 12 illustrates an example for control channel implementation for controlling the optical module emulator.

The control interface signals transmitted by the optical module emulator to the emulator controller comprise the signals SDA and SCL. The control signals transmitted by the optical module emulator to the emulator controller comprise for example, interrupt requests IRQ1 and IRQ2.

The control interface received at the optical module emulator and transmitted by the emulator controller comprises the signals SDA and SCL. The control signals received at the optical module emulator from the emulator controller may comprise for example, control signals SPARE1 and SPARE2 which may be used to provide any form of control to the optical module emulator.

Figure 13:
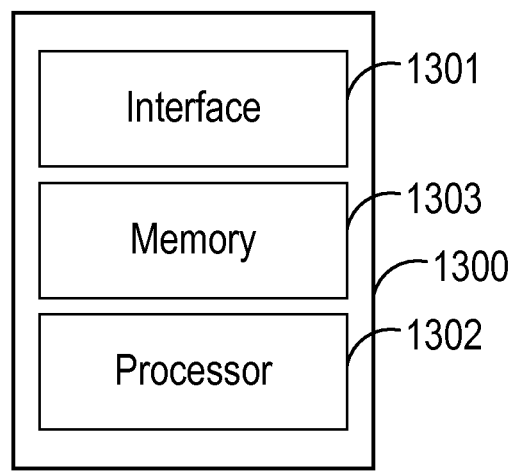
FIG. 13 illustrates an example of an emulator controller according to some embodiments.

FIG. 13 illustrates an example of an emulator controller 1300 according to some embodiments. The emulator controller 1300 comprises an interface 1301, a processor 1302 and a memory 1303. The processor may be any type of processor, e.g. integrated circuitry or processing circuitry, e.g. in form of an FPGA (Field Programmable Gate Array) and/or ASIC (Application Specific Integrated Circuitry). The processor may be configured to receive, from an optical module emulator, a first serial data stream comprising the plurality of upstream signals multiplexed into a plurality of bits; wherein the first data stream comprises a plurality of frames, each frame comprising a multi-frame alignment bit. The processor 1302 may be further configured to de-multiplex the plurality of upstream signals based on each multi-frame alignment bit within each respective frame. In some embodiments it will be appreciated that the processor 1302 may be configured to perform a method such as the method illustrated in FIG. 8. The memory 1303 may comprise a receive buffer as described in FIG. 8. The memory 1303 may also comprise the predetermined MFAW.

Figure 14:
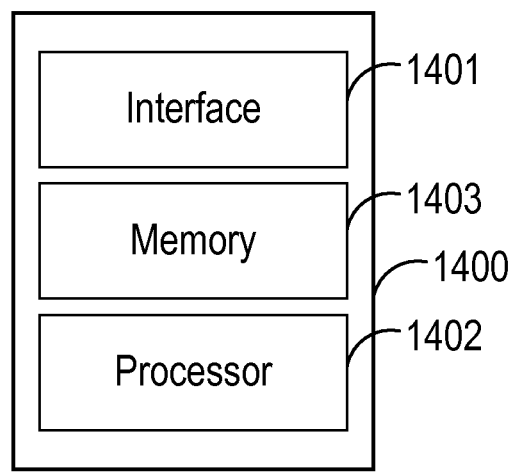
FIG. 14 illustrates an example of an optical module emulator according to some embodiments

FIG. 14 illustrates an example of an optical module emulator 1400 according to some embodiments. The optical module emulator 1400 comprises an interface 1401, a processor 1402 and a memory 1403. The processor 1402 may be configured to receive, from the emulator controller, a second serial data stream comprising the plurality of downstream signals multiplexed into a plurality of bits; wherein the second serial data stream comprises a plurality of frames, each frame comprising a multi-frame alignment bit. The processor 1402 may be further configured to de-multiplex the plurality of downstream signals based on each multi-frame alignment bit within each respective frame. In some embodiments it will be appreciated that the processor 1402 may be configured to perform a method such as the method illustrated in FIG. 9. In some embodiments, the memory 1403 may comprise the predetermined MFAW.

There is therefore provided methods and apparatus for emulating an optical module such that the signals may be transmitted between an optical module emulator and an emulator controller over a serial data stream in each direction. This therefore allows the optical module itself to be physically separated from a host computer.

In some examples, the emulator controller or optical module emulator may be considered as a plurality of units or modules. The units or modules may be implemented with a processor 1402, and optionally memory 1403. The units or modules may be functional units or modules, and may for example be implemented in an integrated circuit. In some examples, the emulator controller 1300 or optical module emulator 1400 are for obtaining a plurality of upstream or downstream signals for transmission to, or reception from, an optical module.

The emulator controller may comprise a receiving module configured to receive from an optical module emulator a first serial data stream comprising the plurality of upstream signals multiplexed into a plurality of bits. The first data stream comprises a plurality of frames, each frame comprising a multi-frame alignment bit. The emulator controller further comprises a de-multiplexing module configured to de-multiplex the plurality of upstream signals based on each multi-frame alignment bit within each respective frame.

The optical module emulator may comprise a receiving module configured to receive from an emulator controller a second serial data stream comprising a plurality of downstream signals multiplexed into a plurality of bits. The second serial data stream comprises a plurality of frames, each frame comprising a multi-frame alignment bit. The optical module emulator further comprises a de-multiplexing module configured to de-multiplex the plurality of downstream signals based on each multi-frame alignment bit within each respective frame.

It should be noted that the above-mentioned embodiments illustrate rather than limit the invention, and that those skilled in the art will be able to design many alternative embodiments without departing from the scope of the appended claims. The word "comprising" does not exclude the presence of elements or steps other than those listed in a claim, "a" or "an" does not exclude a plurality, and a single processor or other unit may fulfil the functions of several units recited in the claims. Any reference signs in the claims shall not be construed so as to limit their scope.

The invention claimed is:

1. A method in an emulator controller for obtaining a plurality of upstream signals for transmission to an optical module, the method comprising:
    receiving a first serial data stream comprising the plurality of upstream signals multiplexed into a plurality of bits, the first data stream comprising a plurality of frames, each frame comprising a multi-frame alignment bit; and
    de-multiplexing the plurality of upstream signals based on each multi-frame alignment bit within each respective frame, the plurality of upstream signals comprising at least one of a control interface and at least one control signal.

2. The method as claimed in claim 1, wherein each multi-frame alignment bit comprises a bit from a predetermined multi-frame alignment word, MFAW, wherein the predetermined MFAW comprises a sequence of N bits, wherein N is an integer greater than 1.

3. The method as claimed in claim 2 further comprising:
    locating, in the first serial data stream, the predetermined MFAW, wherein each multi-frame alignment bit populates a predetermined position within one of the plurality of frames.

4. The method as claimed in claim 1, further comprising:
    first transmitting a control system clock to an optical module emulator; and
    receiving a retransmission of the control system clock from the optical module emulator.

5. The method as claimed in claim 1, wherein the control interface comprises at least one of the following: serial control data transmitted from the host computer to the optical module; a serial control clock transmitted from the host computer to the optical module; serial control data transmitted between the optical module emulator to the emulator controller; a serial control clock transmitted between the optical module emulator and the emulator controller; and control signals transmitted from the host computer to the optical module.

6. The method as claimed in claim 1, wherein an optical module comprises one of a Small Form-Factor Pluggable (SPF) and a Quad SFP (QSFP).

7. A method in an optical module emulator for obtaining a plurality of downstream signals transmitted by an emulator controller, the method comprising:
    receiving, from the emulator controller, a second serial data stream comprising the plurality of downstream signals multiplexed into a plurality of bits, the second serial data stream comprising a plurality of frames, each frame comprising a multi-frame alignment bit; and de-multiplexing the plurality of downstream signals based on each multi-frame alignment bit within each respective frame, the plurality of downstream signals comprising at least one of a control interface and at least one control signal.

8. The method as claimed in claim 7, wherein each multi-frame alignment bit comprises a bit from a predetermined multi-frame alignment word, MFAW, wherein the predetermined MFAW comprises a sequence of N bits, wherein N is an integer greater than 1.

9. The method as claimed in claim 8 further comprising:
locating, in the second serial data stream, the predetermined MFAW; wherein each multi-frame alignment bit populates a predetermined position within one of the plurality of frames.

10. The method as claimed in claim 7, further comprising:
positioning, in a first serial data stream, respective predetermined multi-frame alignment bits in each respective frame;
sampling a plurality of upstream signals to be transmitted to the emulator controller;
multiplexing the sampled plurality of upstream signals into remaining bits of the first serial data stream; and
transmitting the first serial data stream to the emulator controller.

11. The method as claimed in claim 10, further comprising locating the predetermined MFAW by determining that a correct MFAW has been received in the second serial data stream before transmitting the first data stream to the emulator controller.

12. An emulator controller for obtaining a plurality of upstream signals for transmission to an optical module, the emulator controller comprising:
an interface; and
a processor, the processor being configured to:
receive a first serial data stream comprising the plurality of upstream signals multiplexed into a plurality of bits, the first data stream comprising a plurality of frames, each frame comprising a multi-frame alignment bit; and
de-multiplex the plurality of upstream signals based on each multi-frame alignment bit within each respective frame, the plurality of upstream signals comprising at least one of a control interface and at least one control signal.

13. The emulator controller as claimed in claim 12, wherein each multi-frame alignment bit comprises a bit from a predetermined multi-frame alignment word, MFAW, wherein the predetermined MFAW comprises a sequence of N bits.

14. The emulator controller as claimed in claim 12, wherein the processor is configured to locate the predetermined MFAW by:
receiving a first bit causing a toggle in the first serial data stream;
setting the first bit as a first bit of the MFAW in a first frame of N consecutive frames,
setting the position of the first bit as the predetermined position within the first frame; and
determining whether bits populating the predetermined position in a following N-1 consecutive frames of the first serial data stream match the sequence of N bits wherein N is an integer greater than 1.

15. The emulator controller as claimed in claim 14, wherein the processor is further configured to, responsive to a determination that the bits populating the predetermined position within the following N-1 consecutive frames of the first serial data stream match the sequence of N bits, determine that a correct MFAW has been received.

16. The emulator controller as claimed in claim 14, wherein the processor is further configured to, responsive to a determination that the bits populating the predetermined position in the following N-1 consecutive frames of the first data stream do not match the sequence of N bits, repeat the step of locating the MFAW.

17. The emulator controller as claimed in claim 12, wherein the control interface comprises at least one of the following: serial control data transmitted from the host computer to the optical module; a serial control clock transmitted from the host computer to the optical module; serial control data transmitted between the optical module emulator to the emulator controller; a serial control clock transmitted between the optical module emulator and the emulator controller; and control signals transmitted from the host computer to the optical module.

18. An optical module emulator for obtaining a plurality of downstream signals transmitted by an emulator controller, the optical module emulator comprising:
an interface; and
a processor, wherein the processor is configured to:
receive, from the emulator controller, a second serial data stream comprising the plurality of downstream signals multiplexed into a plurality of bits, the second serial data stream comprising a plurality of frames, each frame comprising a multi-frame alignment bit; and
de-multiplex the plurality of downstream signals based on each multi-frame alignment bit within each respective frame, the plurality of downstream signals comprising at least one of a control interface and at least one control signal.

19. The optical module emulator as claimed in claim 18, wherein each multi-frame alignment bit comprises a bit from a predetermined multi-frame alignment word, MFAW, wherein the predetermined MFAW comprises a sequence of N bits.

20. The optical module emulator as claimed in claim 19 wherein the processor is further configured to:
locate, in the second serial data stream, the predetermined MFAW; wherein each multi-frame alignment bit populates a predetermined position within one of the plurality of frames.

21. The optical module emulator as claimed in claim 18, wherein the processor is further configured to:
position, in a first serial data stream, respective predetermined multi-frame alignment bits in each respective frame;
sample a plurality of upstream signals to be transmitted to the emulator controller;
multiplex the sampled plurality of upstream signals into remaining bits of the first serial data stream; and
transmit the first serial data stream to the emulator controller.

22. The optical module emulator as claimed in claim 21, wherein the processor is further configured to locate the predetermined MFAW by determining that a correct MFAW has been received in the second serial data stream before transmitting the first data stream to the emulator controller.

* * * * *